Jan. 6, 1959 — S. CHARNOCK — 2,867,059
APPARATUS FOR SIMULTANEOUSLY GRINDING
THE TWO SURFACES OF A RIBBON OF GLASS
Filed Aug. 29, 1956 — 2 Sheets-Sheet 1
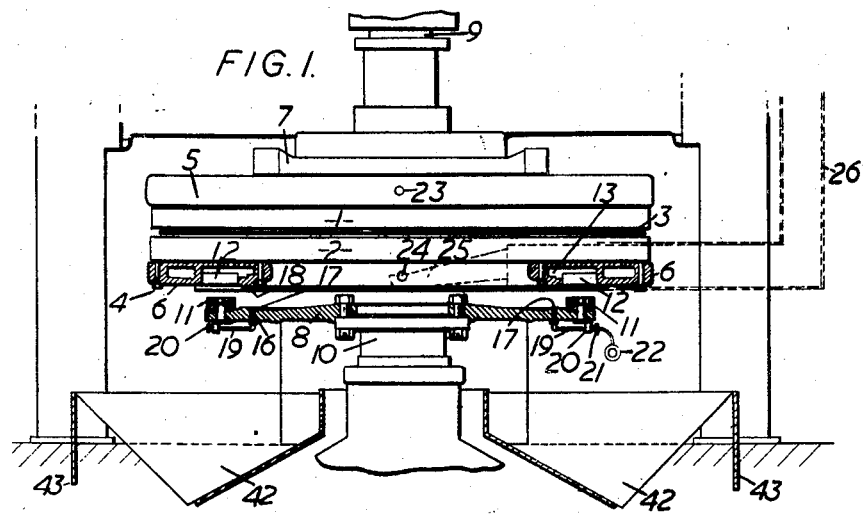
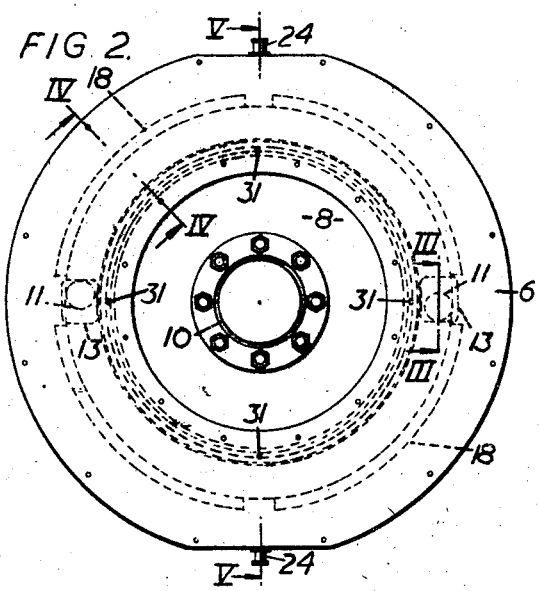
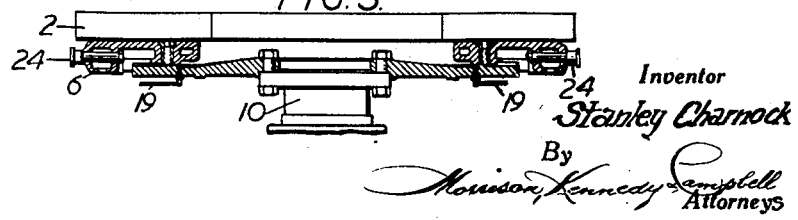
Inventor
Stanley Charnock
By
Morrison, Kennedy Campbell
Attorneys Jan. 6, 1959 S. CHARNOCK 2,867,059
APPARATUS FOR SIMULTANEOUSLY GRINDING
THE TWO SURFACES OF A RIBBON OF GLASS
Filed Aug. 29, 1956 2 Sheets-Sheet 2
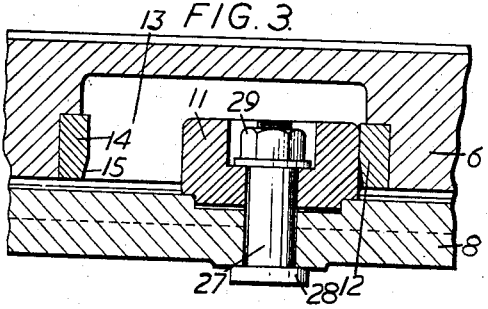
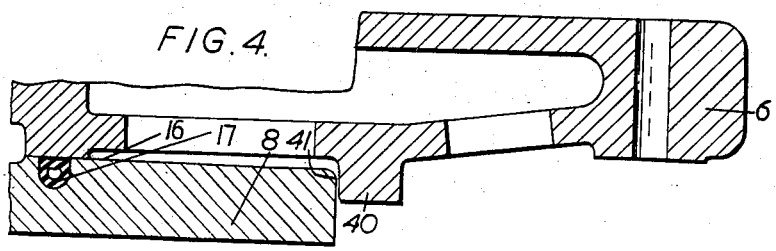
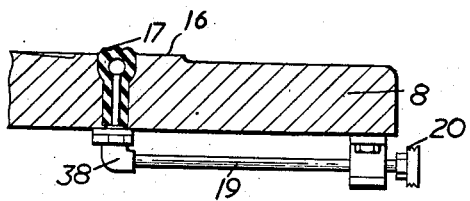
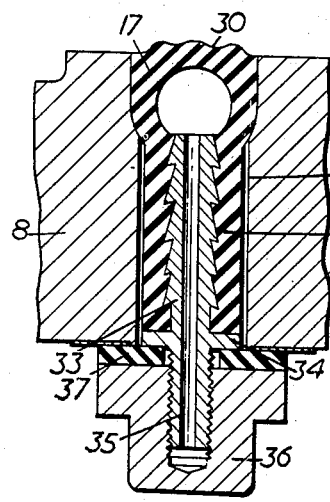
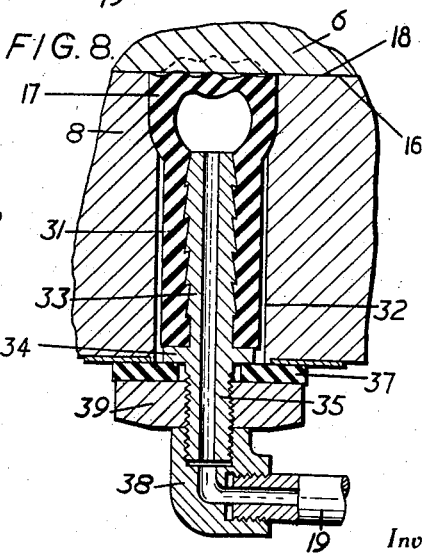
Inventor
Stanley Charnock
By
Morrison Kennedy Campbell
Attorneys

2,867,059

APPARATUS FOR SIMULTANEOUSLY GRINDING THE TWO SURFACES OF A RIBBON OF GLASS

Stanley Charnock, St. Helens, England, assignor to Pilkington Brothers Limited, Liverpool, England, a corporation of Great Britain Application August 29, 1956, Serial No. 606,834

Claims priority, application Great Britain September 1, 1955

6 Claims. (Cl. 51—112)

This invention relates to twin grinder apparatus for grinding a ribbon of glass.

In the manufacture of ground, or ground and polished glass, a common practice is to form a horizontal ribbon of glass from molten glass flowed from a glass melting furnace between sizing rolls which continually produce a ribbon of pre-determined thickness. The ribbon thus formed is advanced through a lehr, and on leaving the lehr is driven between two series of coaxial grinder discs, and if polishing is being effected, also between two series of co-axial polishers. The two series of grinder discs and polishers simultaneously operate on the two surfaces of the continuous ribbon, and their axes are perpendicular to the ribbon, and this type of apparatus is generally referred to as "twin" apparatus.

The heads on which the grinder discs and polishers are mounted are usually fixed with respect to the ribbon, but sometimes the heads are mounted to be laterally movable to one side of the ribbon to give ready access to the bottom grinder discs or polishers, as the case may be, for the purpose of repair or renewal, and in such construction the lateral movement is accompanied by the disposal of a table support under the ribbon to take over the work of supporting the ribbon from the retracted bottom grinder.

The present invention is concerned primarily with the construction of twin grinder apparatus having fixed heads.

In the well-known "twin" apparatus for simultaneously grinding both surfaces of a ribbon of glass as it is advanced from the lehr, each head comprises co-axial upper and lower grinder discs and each disc is set on a backing plate to which it is bolted to form a unit in the apparatus, and the backing plate is in turn bolted to an adaptor plate, which latter is fixed to the respective hollow driving shaft of the head.

The adaptor plate and the backing plate are formed with horizontal annular machined faces which abut when the backing plate is secured to the adaptor plate. Abrasive fluid is continually fed through the hollow shaft and passes through the adaptor plate into the central cavity of the unit from whence, as the head rotates, the abrasive fluid is distributed over the operating surface of the disc.

To repair or renew a bottom unit, the unit and its respective adaptor plate are lowered as far as possible from the ribbon and the usual fixing bolts connecting the unit with the adaptor plate are removed, thus releasing the unit from its adaptor plate. A special lifting member, known as a "swan neck," which is suspended from the overhead crane which serves the "Twin" apparatus, is then projected under the ribbon to engage under diametrically opposed trunnions on the backing plate, and is then operated to lift the unit from its adaptor plate and to withdraw it to one side of the ribbon.

A renewed or repaired unit is afterwards located by the "swan neck" on the adaptor plate and bolted to it. When the bottom grinder unit is lowered, the ribbon above it is unsupported and it is then necessary to stop the entry of the ribbon between the series of opposed co-axial grinder units, and during the time that a bottom grinder unit is not acting as a support for the ribbon, the ribbon produced from the sizing rolls has to be cut at intervals and the severed lengths of rough-cast ribbon must be ground and polished by individually treating the two surfaces of the severed ribbon.

The main object of the present invention is to devise a bottom grinder unit for use in Twin apparatus having fixed heads, which is easily demountable and made accessible for repair or renewal.

The invention permits the use of a method of assisting symmetrical initial relative axial displacement of a bottom grinder unit in a twin grinder apparatus from its adaptor plate, the latter driving the unit by means of cylindrical drivers and associated abutment faces, consisting in inflating a tubular ring located between the unit and the plate in order to assist in separating the unit from the adaptor plate by axially directed forces which are of uniform magnitude at all points between the unit and the adaptor plate. By such control of the initial movement of the grinder disc, any tendency to rock as it is hoisted is eliminated, and thereby the creation of a movement which might lead to the unit binding on the adaptor plate is avoided.

The invention comprehends the combination of a bottom grinder unit with an adaptor plate therefor, characterised in that the drive between the unit and the adaptor plate is constituted by cylindrical drivers on the one and an abutment plate for each driver on the other, so that only line-contact exists between the elements of the drive; and a tubular resilient ring located between the horizontal juxtaposed machined faces of the unit and adaptor plate and housed in one of them, said ring when compressed against its resilience between the adaptor plate and backing plate of the unit forming a seal protecting the drive between them against seeping thereto of abrasive fluid from the central cavity of the unit.

A preferred construction according to the invention is characterised by the adaptor plate being provided with diametrically opposed cylindrical drivers and the contiguous face of the backing plate of the bottom grinder unit being formed with open housings each presenting a flat abutment face for one of the drivers when the latter are accommodated in the housings by mere axial displacement of the unit onto the adaptor plate, the adaptor plate having an endless concentric channel formed in the annular machined face of the plate in which channel is located a tubular resilient ring, said ring when compressed against its resilience between the adaptor plate and backing plate of the unit forming a seal protecting the fit between the adaptor plate and the backing plate and the drive between them, against seeping thereto of abrasive fluid from the central cavity of the unit.

By mounting the drivers on the adaptor plate they remain in the installation when the grinder unit is removed and are accordingly not exposed to damage during storage or transport of the grinding units as they might be if mounted on the grinder unit.

The tubular ring may be provided with a valved pipe through which fluid may be pumped into the ring to achieve a pressure in the ring to assist in separating the grinder unit from its adaptor plate when dismantling is required.

In order that the invention may be more clearly understood, one preferred embodiment thereof will now be described, by way of example, with reference to the accompanying drawings in which:

Figure 1 illustrates, in elevation and partly in section, one fixed head of twin grinder apparatus, including a bottom grinder unit and an adaptor plate in accordance with the invention.

Figure 2 is a plan view of the backing plate and adaptor plate of the bottom grinder unit illustrated in Figure 1.

Figure 3 is a sectional elevation to enlarged scale taken on the line III—III of Figure 2.

Figure 4 is a detail sectional elevation to the same scale as Figure 3 taken on the line IV—IV of Figure 2, showing the spigot fitting of the backing plate to the adaptor plate.

Figure 5 is a sectional elevation through the bottom unit and adaptor plate taken on the line V—V of Figure 2.

Figure 6 is a fragmentary sectional elevation to an enlarged scale more clearly showing the form of mounting of the tubular ring in the adaptor plate.

Figure 7 is a detail view showing the sectional form of the tubular ring after inflation, and, Figure 8 is a similar view showing the form of the tubular ring 17 when the grinder unit is in driving relation with its adaptor plate.

In the drawings like reference numerals designate the same parts.

In the drawings one fixed head only is shown of a usual longitudinal series of fixed heads through which the ribbon of glass is advanced by pairs of driving rollers (not shown) in the operations of grinding and smoothing the ribbon.

In Figure 1, for sake of clarity, the upper and lower grinder discs 1, 2 are shown slightly retracted from the ribbon 3, although in practice the ribbon is sandwiched between the upper and lower grinder discs as they simultaneously effect a surfacing operation of the two faces of the ribbon. In Figure 1 of the drawings, the adaptor plate 8 is shown separated from the backing plate 6 of the bottom grinder unit for sake of clarity in illustrating the construction according to the invention, the normal abutting relation of the two being clearly shown in Figure 2.

Each grinder disc is bolted, as indicated at 4 in Figure 1, to its respective backing plate 5, 6. Thus each grinder disc is associated with a backing plate to form a grinder unit assembly which exists as such until the grinder disc is replaced by a new one. The grinder unit is connected to a respective adaptor plate 7, 8 by driving means, hereinafter referred to, actuated from respective hollow driving shafts 9, 10 thereby rotating the respective grinder disc to effect the desired surfacing operation on the opposed face of the ribbon of glass.

The upper grinder unit may be bolted to its adaptor plate, but in accordance with the present invention the rotation of the bottom grinder disc 2 is effected by a drive comprising cylindrical drivers and corresponding abutment faces for the drivers, the adaptor plate being provided with cylindrical drivers indicated at 11 and the backing plate with abutment faces indicated at 12. Each driver 11 is of cylindrical form and each abutment face 12 is flat so that there is only a line contact between each driver and its respective abutment face.

The backing plate 6 is formed with open housings 13 to receive the cylindrical drivers 11, the mouth of each housing 13 giving free entry of the respective driver into the respective housing.

As most clearly shown in Figure 3, the housing has inset plates 12 and 14 which are renewable, providing the flat abutment faces for the respective driver, and the lower part of the plates is chamfered to give a lead to the backing plate when it is lowered over the drivers. Two plates 12, 14 are provided in each housing to permit the drive to be either clockwise or anti-clockwise.

As is well known, the operating surface of the bottom grinder disc 2 is provided with abrasive fluid supplied through the respective hollow shaft 10 through the adaptor plate 8 and through the central cavity of the grinder unit which is defined within the grinder disc and its backing plate, and to prevent seepage of abrasive fluid to the drive between the adaptor plate and the unit an annular seal is formed on the inside of the path of the drive. To this end the usual annular machined face 16 on the adaptor plate is, in accordance with the present invention, grooved to receive a resilient tubular ring 17 which is just proud of the machined face, then, when the grinder unit is applied to the adaptor plate, its weight is sufficient to compress the resilient tubular ring 17 until the machined face 18 of the backing plate of the unit abuts against the face 16 on the adaptor plate, and the resilient annular ring 17 forms a seal preventing seepage of abrasive fluid to the drivers.

A further advantage of the seal 17 is that it protects the usual spigot joint between the grinder unit and the adaptor plate against seepage of abrasive fluid. The usual spigot joint comprises an annular shoulder, illustrated at 40 in Figure 4, the inner face of which shoulder is machined to fit over the machined peripheral face indicated at 41 of the adaptor plate with a radial clearance of the order of .02 of an inch.

As clearly indicated in Figure 1, the annular ring 17 may be connected by a pipe 19 provided with a valve 20 and a further union connection 21 to a pump indicated at 22. By such construction, fluid may be forced into the annular ring 17 and such a pressure achieved as to assist in lifting the grinder unit from its adaptor plate. The fluid with which the ring 17 may be charged may be air, or water, or oil.

The backing plates 5, 6 are each in known manner provided with diametrically opposed trunnions 23, 24 which are engaged by a lifting arm indicated at 25 attached to a lifting member indicated at 26 of the kind generally known as a "swan neck." By use of such lifting member, the grinder unit can be raised axially until the unit is clear of the cylindrical drivers and then withdrawn to the side of the ribbon 3, for transport to the sites where renewal or repair is effected.

As clearly shown in Figure 3, each cylindrical driver 11 is preferably constituted as a cup-like element which is clamped to the adaptor plate by a bolt 27, the head 28 of which engages the under-face of the adaptor plate and the nut 29 of which is housed within the driver 11. In the event of wear on the driver taking place so that a zone of contact with the abutment face 12 is created (instead of line-contact), the clamping bolt may be loosened to permit rotation about the clamping bolt of the element 11 to restore line-contact with the abutment face 12, and then tightened up again to clamp the driver 11 in the new position of adjustment.

The tubular resilient ring 17 has a ribbed surface 30 which provides concentric seals between the adaptor plate and the grinder unit when the two are associated in driving relation, and to anchor the tube within the channel formed in the machined face of the adaptor plate, the tube is provided with four equidistant branches 31 which are vertically disposed in bores 32 in the adaptor plate when the ring 17 is seated in the channel.

Each of the branches 31 is held within the respective bores 32 of the adaptor plate by stepped nozzle members 33, each comprising a flange 34 which is firmly seated on the extremity of the branch, and a threaded stem 35.

Of these four branches 31, two which are diametrically opposed are each sealed by a cap 36 which engages over the respective threaded stem 35, a sealing washer 37 being interposed between the cap and the underface of the adaptor plate 8.

The other two branches are each provided with an elbow 38, the free end of which is tapped to receive one end of the pipe 19, and between the elbow 38 and the respective branch 31, is disposed a locking nut 39 which engages over the threaded stem 35 of the respective branch, a sealing washer 37 being interposed between the nut 39 and the adaptor plate 8.

The two pipes 19 may be, as already explained, connected to a hydraulic pump so that fluid under pressure can be forced into the ring 17 to assist in separating the grinder unit from its adaptor plate. The tubular ring assists the separation of the grinding unit from the adaptor plate by avoiding lack of symmetry in the separating force which it contributes during the initial movement of separation. Thus any tendency in the grinder unit to rock about its trunnions, which movement might lead to the grinder unit binding on the adaptor plate, as the separation takes place, is entirely avoided.

The usual cullet collectors are indicated at 42 and their usual supports shown at 43.

I claim:

1. The combination in and for an apparatus for simultaneously grinding the two surfaces of a ribbon of glass travelling substantially horizontally, comprising a bottom grinder unit and an adapter plate unit therefor, said units having axial communicating hollows for conducting abrasive fluid to the operative surface of said grinder unit, cylindrical drivers carried by one of said units on upright axes, the other unit defining upright faces against which said drivers abut with line contacts for rotary drive action of said units about a substantially vertical axis, said units having confronting faces extending generally transverse to the latter axis, and a resilient sealing ring located between said faces and extending along said faces and about said hollows, said ring being housed in one of said units and extending on the radially inner sides of said drivers, to prevent seepage of abrasive fluid from said hollows along said faces to said drivers.

2. The combination as described in claim 1, wherein said ring is tubular and has an inlet connection for introducing fluid under pressure therein and for thereby distending the ring into compressive engagement with the confronting face of one of said units.

3. The combination as described in claim 1, said units being separable by merely relatively axially displacing said units apart, said ring being tubular, circular and endless and being concentric with the axis of rotation of said units, said ring having a valved inlet connection for introducing fluid under pressure therein to distend said ring into compressive sealing engagement with the confronting face of one of the units to assist in the axial separation of the units when dismantling is required.

4. The combination in and for an apparatus for simultaneously grinding the two surfaces of a ribbon of glass travelling substantially horizontally, comprising a bottom grinder unit and an adapter plate therefor, said grinder unit and said adapter plate having axial communicating hollows for conducting abrasive fluid to the operative surface of said grinder unit, said grinder unit having a backing plate with a force confronting a face on said adapter plate and having a complemental fit with said adapter plate when the grinder unit and the adapter plate are in operative position, said backing plate being formed with a number of housings arranged around said hollows and extending from the confronting face of said backing plate, each of said housings being opened on the end thereof coextensive with the latter face and presenting a flat abutment upright face, a corresponding number of cylindrical drivers carried on said adapter plate on upright axes and adapted upon mere relative axial displacement of said grinder unit and said adapter plate towards each other to extend through the open ends of said housings respectively and into said housings in drive contact with said abutment faces to drive said grinder unit and said adapter plate in unison for rotation about a substantially vertical axis, said adapter plate having an annular channel on its confronting face concentric with said vertical axis and extending on the radially inner sides of said drivers, and a tubular resilient ring in said channel and extending outwardly therefrom, said ring being adapted to be compressively pressed into sealing contact with the confronting face of said backing plate to protect the fit between said backing plate and said adapter plate and to prevent seepage of abrasive fluid from said hollows along said faces to said drivers.

5. The combination as described in claim 4, wherein two cylindrical drivers are provided diametrically opposed in relation to the axis of rotation of the grinder unit and adapter plate and two housings are provided diametrically opposed in relation to the latter axis to receive said drivers respectively.

6. The combination as described in claim 5, wherein said channel is circular and endless, and said ring is also circular and endless and said ring is tubular and has a valved inlet connection for introducing fluid under pressure therein to distend said ring into compressive sealing engagement with the confronting face on said backing plate to assist in the axial separation of said grinder unit and said adapter plate when dismantling is required.

References Cited in the file of this patent

UNITED STATES PATENTS

| | | |
|---|---|---|
| 2,279,782 | Fowler | Apr. 14, 1942 |
| 2,749,684 | Schuhmann | June 12, 1956 |
| 2,776,527 | Hoyet et al. | Jan. 8, 1957 |